Sept. 20, 1955 W. E. ARMSTRONG 2,718,294
AUTOMATIC, CENTRIFUGAL CLUTCH MECHANISMS
Filed July 27, 1951 2 Sheets-Sheet 1

INVENTOR.
WERNER E. ARMSTRONG
BY
Christian R. Nielsen
ATTORNEY.

INVENTOR.
WERNER E. ARMSTRONG

United States Patent Office 2,718,294
Patented Sept. 20, 1955

2,718,294

AUTOMATIC, CENTRIFUGAL CLUTCH MECHANISMS

Werner E. Armstrong, Milwaukee, Wis., assignor, by mesne assignments, to Fairbanks, Morse & Co., Chicago, Ill., a corporation of Illinois Application July 27, 1951, Serial No. 238,944

3 Claims. (Cl. 192—105)

My invention apertains to centrifugal clutches, and more particularly to a novel device employed for transmitting power from a driving unit to a driven unit in a manner to permit the load to be gradually assumed by the driving unit without imparting undue strain to the driving unit.

The prime object of my invention is to provide a clutch mechanism that is equipped with a plurality of friction shoes which are molded into individual integral units of suitable heat resisting and absorbing material, the shoe being adjustably and slidably connected to the driving unit for co-operative frictional contact with a friction drum attached to the driven unit, the centrifugal speed of the driver unit being the actuating force for bringing the shoes into gradual frictional engagement with the drum.

Another object of my invention is to provide a clutch disposed between the drive unit and the driven unit that will permit the drive unit to reach a pre-determined normal speed without a load, and whereby an accelerated speed will cause the device to gradually function to develop frictional engagement of the drive unit with the driven unit, thereby eliminating the excessive torque load usually encountered when setting a driving mechanism in motion.

Still another object of my invention is to provide a device in which the friction shoes are slidably guided in an integrally constructed spider or guide member, and are prevented from lateral longitudinal displacement by integral members forming a part of the spider.

The device is simple in construction, positive in its action and economical to manufacture.

Other and further objects of my invention will become more apparent as the description proceeds, when taken in conjunction with the drawings in which.

Figure 1:
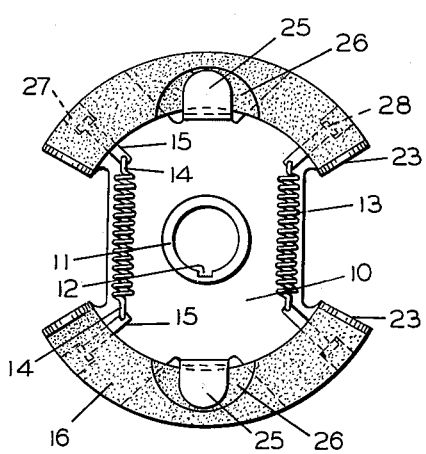
Figure 1 is a front plan view of the individual, integrally molded friction shoes, assembled with the integrally constructed spider member.

Similar characters of reference indicate corresponding parts throughout the several views, and referring now to the same, the character 10 shows a stamped spider which is of a one-piece construction, and is provided at its central portion with a circular insert 11 shown with a key-way 12 for engagement with the armature shaft of a motor or the like (not shown) which acts as a driving unit.

There are shown a pair of expansion springs 13 attached at both of their loop ends 14, to retaining members 15 inserted into integrally molded arcuated friction shoes which are shown as 16, and constructed of a heat-resisting material.

Figure 5:
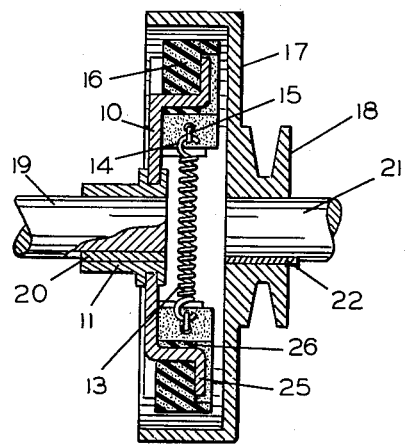
Figure 5 is a vertical, cross-sectional view of the assembled unit taken at the line 5—5 in Figure 2.
Figure 6:
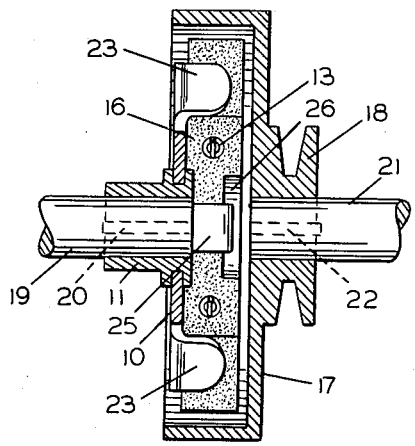
Figure 6 is a horizontal, cross-sectional view of the assembled unit taken at the line 6—6 in Figure 2.

In Figures 5 and 6, I show cross-sectional views, which incorporate, with the spider 10 and the shoe 16, a drum 17 which is provided with a grooved pulley 18 to accommodate a V-belt. There are also shown the drive shaft 19 which engages the spider 10, and fastened by means of a key 20, and a driven shaft 21 engaging the drum 17 equipped with a key 22.

Figure 7:
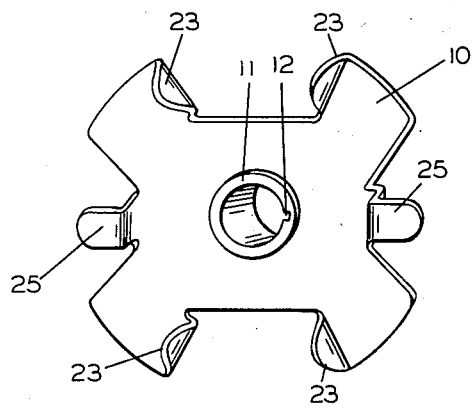
Figure 7 is a perspective view of the integral spider illustrating the manner in which the guide members are projected at right angle from the face thereof.
Figure 8:
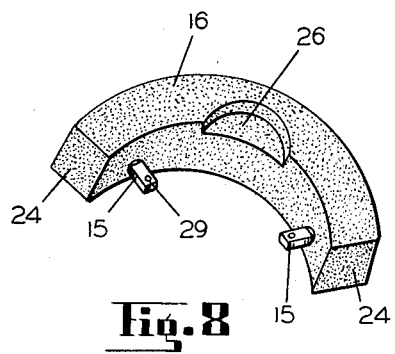
Figure 8 is a perspective view of the integrally molded friction shoe with the spring retaining members inserted therein.

As has been heretofore indicated, spider 10 is of one-piece construction preferably being stamped from sheet metal and formed as illustrated in the drawings, see particularly Fig. 7. The spider as thus formed is provided with four outwardly extending legs transverse to the axis of said spider, which constitute rear guide surfaces slidingly engaging and guiding the rear side surface of the shoes 16, with two of said legs engaging and guiding each shoe. Axially spaced from and intermediately disposed with respect to the legs of each pair of shoe engaging legs are front guide members 25 which are likewise integrally formed with the spider, said members being bent and projected forwardly and then bent outwardly as readily understood from the drawings for properly receiving and loosely embracing the shoes. The front guide members 25 are preferably disposed for engagement within semi-circular depressed portions 26 formed in the front wear resisting side face of each shoe, which depressed portions are materially larger than the dimensions of the front guide members so as to permit relative movement therebetween when the shoes engage the inner surface of the drum 17 under the action of centrifugal force.

Figure 4:
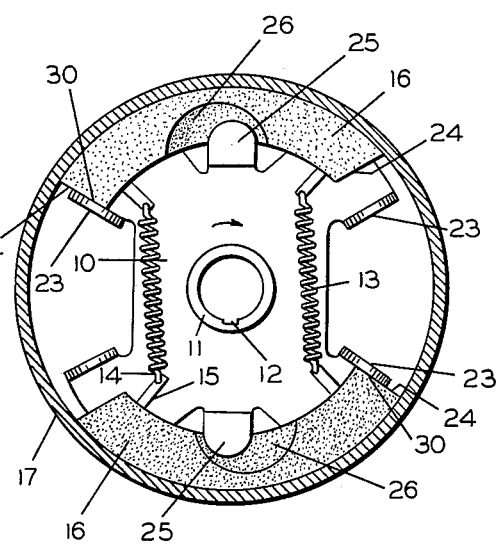
Figure 4 is a similar view as shown in Figure 3 with the friction shoes in engagement with the inside of the drum as when the driving unit is revolving the driven unit.

Additionally the legs of the spider 10 have angularly disposed lug members 23 which extend forwardly at right angles thereto for engaging the end surfaces 24—24 of the friction shoe 16, which surfaces are so engaged when the shoe is not under sufficient centrifugal force to overcome the force of the retaining springs 13. The lug members 23 also constitute so-called driving surfaces for the shoes when the shoes are in engagement with the drum by applying a tangential force to the trailing end face of the shoe thus providing a positive drive as will be understood by reference to Fig. 4 of the drawings.

The friction shoes 16 are provided with tubular recessed portions 27 which permit the insertion of the spring retaining pins 15 which are shown in the form of pins having a head portion 28 on one end, and equipped with an aperture 29 on the other end, which aperture will accommodate the loop ends 14 of the springs shown as 13.

The construction of the device is so simple, yet the operation so positive, and by referring to the drawings, it will become manifest that the one-piece spider 10, when attached to a drive shaft 19, acts as a simple, efficient guide for the oppositely disposed segmental, radial friction shoe 16. Obviously, the number of shoes is optional, but in my illustration, I show a pair of shoes 16 slidably engaging the spider 10 and guided by the members 25 which are a part of the spider 10, and which fit into the semi-radial depressions 26 in the side of the shoe.

Figure 2:
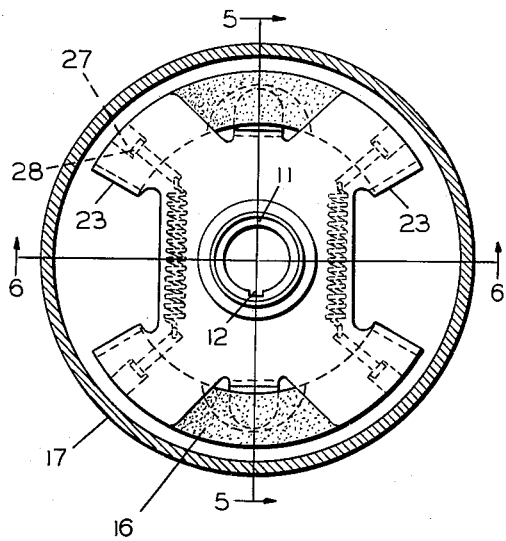
Figure 2 is a rear plan view of the friction shoe engaging the spider and the assembled unit inserted into a conventional drum shown in cross-section.
Figure 3:
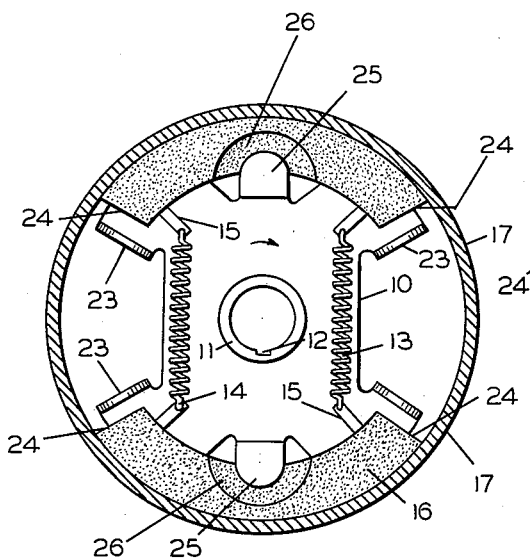
Figure 3 is a front plan view of the assembled unit within the drum in which the friction shoes are outwardly disposed away from one another as when the spider, mounted on the driving unit, is centrifugally revolved.

The shoes are urged inwardly towards one another by the springs 13, and rest in the guide members 25 of the spider 10 as is shown in Figure 2, and are kept in alignment by the members 23 which contact the end faces 24 of the shoe 16.

As the spider is revolved, the centrifugal force of the parts, driven by the drive shaft 19 and spider 10, will cause the shoes 16 to move outwardly away from one another, toward the inside face of the drum 17, and out of engagement with the member 23, but still within the engagement of the members 25. As the normal speed of the shaft 19 increases, the centrifugal force will create frictional engagement with the drum 17, thereby causing the drum 17, which normally is in a stationary position, to revolve in the same direction as the spider 10. The load will cause one of the end faces of the shoe 16 to contact the member 23 as shown at 30 in Figure 4, to provide positive drive. The sideway movement of the shoe 16 is made possible by the semi-circular groove or indentation 26 on the side of the shoe 16, it being larger in diameter than the diameter of the guide 25.

A feature which I wish to emphatically stress in the construction of my device is the fact that the arcuated segments or shoes 16 are molded of a solid and single mass of heat-resisting and absorbing material which does not require relining on the contact surface which is always a necessity with the conventional type of shoe, and the fact that the shoe 16 is constructed integrally eliminates the hazard of uneven wear during its contact with the inner surface of the drum.

In the chosen embodiments of my invention, exemplified by the accompanied drawings, there are many features not heretofore anticipated by the prior art, and although I have shown a specific construction and a particular arrangement of the component parts constituting the device, I am fully cognizant of the fact that in the future development of my invention, many changes may be made in the form and configuration of these component parts without affecting their operativeness, the spirit of my invention or the scope of the appended claims.

Having thus described my invention, what I claim and desire to secure by Letters Patent in the United States is:

1. In a centrifugally engaged clutch the combination comprising a surrounding cylindrical driven drum including means for mounting the same for rotation about an axis concentric therewith; a set of arcuate segmental friction shoes each providing an outer arcuate wear resisting friction face for engagement with the interior of said surrounding drum and providing front and rear wear resisting side faces; inwardly acting resilient means connected to said shoes to urge the same inwardly out of contact with said drum, yieldable in response to centrifugal force developed in said shoes to permit the same to forceably engage said drum when undergoing rotation; and a driving and mounting spider for said shoes including means mounting said spider for rotation within said drum with its axis concentrically disposed with respect to said drum, said spider including rear guide surfaces transverse to the axis thereof slidingly engaging and guiding the rear side surfaces of said shoes, axially spaced front guide surfaces slidingly engaging and guiding the front side surfaces of said shoes, and driving surfaces engaging said shoes to apply a tangential force thereto when said shoes are in engagement with said drum.

2. A clutch in accordance with claim 1 in which the spider comprises a single, sheet metal stamping, having a principal transverse driving portion providing the rear guiding surfaces thereof, forwardly projecting outwardly extending guide lugs integral therewith providing the front guiding surfaces thereof, and integrally formed tangentially acting driving lugs.

3. A clutch in accordance with claim 1 in which the set of shoes comprises a single diametrically disposed pair and in which the resilient means join the shoes constituting the pair resiliently to one another.

References Cited in the file of this patent

UNITED STATES PATENTS

| | | |
|---|---|---|
| 521,160 | Geiger | June 12, 1894 |
| 574,209 | McFadden | Dec. 29, 1896 |
| 1,373,085 | Leitch | Mar. 29, 1921 |
| 1,859,963 | Futscher | May 24, 1932 |
| 2,386,645 | Williams | Oct. 9, 1945 |
| 2,504,177 | Bruestle | Apr. 18, 1950 |
| 2,626,033 | Lewis et al. | Jan. 20, 1953 |

FOREIGN PATENTS

| | | |
|---|---|---|
| 240,449 | Great Britain | Sept. 18, 1925 |
| 24,833 | Great Britain | July 26, 1912 |